(12) United States Patent
Choi et al.

(10) Patent No.: US 9,145,302 B2
(45) Date of Patent: Sep. 29, 2015

(54) METHOD FOR PRODUCING GRAPHENE BY CHEMICAL EXFOLIATION

(75) Inventors: Won Kook Choi, Seoul (KR); Dong Hee Park, Seoul (KR); Byoung Wook Kwon, Seoul (KR); Dong Ick Son, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 127 days.

(21) Appl. No.: 13/193,777

(22) Filed: Jul. 29, 2011

(65) Prior Publication Data
US 2012/0308468 A1  Dec. 6, 2012

(30) Foreign Application Priority Data

May 30, 2011 (KR) .......................... 10-2011-0051557

(51) Int. Cl.
*C01B 31/00* (2006.01)
*C01B 31/04* (2006.01)
*B82Y 30/00* (2011.01)
*B82Y 40/00* (2011.01)

(52) U.S. Cl.
CPC .............. *C01B 31/0446* (2013.01); *B82Y 30/00* (2013.01); *B82Y 40/00* (2013.01); *C01B 31/043* (2013.01); *C01B 2204/02* (2013.01)

(58) Field of Classification Search
CPC .... C01B 31/00; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; B82Y 30/00

USPC .......................... 423/448, 445 R; 252/378 R
See application file for complete search history.

(56) References Cited

U.S. PATENT DOCUMENTS

| | | | |
|---|---|---|---|
| 2,798,878 A * | 7/1957 | Hummers, Jr. ................ | 562/400 |
| 2009/0068470 A1* | 3/2009 | Choi et al. .................... | 428/403 |
| 2009/0269269 A1* | 10/2009 | White et al. ............... | 423/437.2 |
| 2010/0173203 A1* | 7/2010 | Zhang et al. ............... | 429/231.8 |
| 2011/0292570 A1* | 12/2011 | Ivanovici et al. ............. | 361/502 |
| 2012/0128570 A1* | 5/2012 | Krishnaiah et al. ......... | 423/415.1 |
| 2012/0161106 A1* | 6/2012 | Kim et al. ....................... | 257/29 |

FOREIGN PATENT DOCUMENTS

KR   1020090027433 A   3/2009

OTHER PUBLICATIONS

Scientific Background on the Nobel Prize in Physics 2010 Graphene, The Royal Swedish Academy of Sciences (Oct. 5, 2010).*
Fitzer, et al., Recommended Terminology for the Description of Carbon as a Solid, Pure & Appl. Chem. 1995; 67(3): 473-508.*
(Continued)

*Primary Examiner* — Daniel C McCracken
(74) *Attorney, Agent, or Firm* — Ladas & Parry LLP

(57) ABSTRACT

Disclosed are methods for preparing pure graphene using chemical bonding between graphite oxide and metal oxide nanoparticles, and graphene and nanoparticles having a quasi metal oxide-graphene core-shell prepared therefrom. The disclosed methods for preparing graphene allow chemical bonding and separation through a simple acid treatment process using inexpensive materials. Also, because the reaction can be carried out at low temperature, the processing cost is low. And, pure graphene with few impurities can be prepared quickly in large scale.

17 Claims, 13 Drawing Sheets

(56) References Cited

OTHER PUBLICATIONS

Yanwu Zhu, et al; "Graphene and Graphene Oxide: Synthesis, Properties, and Applications", Advanced Materials, vol. 22, Issue 35, pp. 3906-3924, Sep. 15, 2010.

Prashant Kumar, et al; "Photoluminescence, white light emitting properties and related aspects of ZnO nanoparticles admixed with graphene and GaN", Nanotechnology, vol. 21, pp. 1-6, Published Aug. 26, 2010.

Duck Hyun Lee, et al; "Versatile Carbon Hybrid Films Composed of Vertical Carbon Nanotubes Grown on Mechanically Compliant Graphene Films", Advanced Materials, vol. 22, Issue 11, pp. 1247-1252, Mar. 19, 2010, Article first published online: Jan. 13, 2010.

Alexander A. Green, et al; "Solution Phase Production of Graphene with Controlled Thickness via Density Differentiation", Nano Letters, Sep. 25, 2009, vol. 9, Issue 12, pp. 4031-4036.

Mauricio Terrones; "Nanotubes unzipped", Nature, vol. 458, No. 16, Apr. 2009, pp. 845-846.

Keun Soo Kim, et al; "Large-scale pattern growth of graphene films for stretchable transparent electrodes", Nature Letters, vol. 457, Feb. 5, 2009, pp. 706-710.

* cited by examiner

METHOD FOR PRODUCING GRAPHENE BY CHEMICAL EXFOLIATION

CROSS-REFERENCE TO RELATED APPLICATIONS

This application claims priority under 35 U.S.C. §119 to Korean Patent Application No. 10-2011-0051557, filed on May 30, 2011, in the Korean Intellectual Property Office, the disclosure of which is incorporated herein by reference in its entirety.

BACKGROUND (a) Technical Field

The present invention relates to a method for preparing pure graphene using chemical bonding between graphite oxide and metal oxide nanoparticles, and graphene and nanoparticles having a quasi metal oxide-graphene core-shell prepared therefrom.

(b) Background Art

Graphene, a miracle material, has a structure of one-atom-thick planar sheets of carbon atoms. Despite the rather short research period as compared to those for other nanocarbon materials such as carbon nanotube (CNT), fullerene or graphite, graphene is highly valued because of its excellent thermal conductivity and electron mobility and peculiar advantages such flexibility. Potential applications of graphene include the followings.

I) Graphene can replace the indium tin oxide (ITO) used in a transparent electrode of a light-emitting diode (LED), solar cell, or the like. With superior flexibility, it can be used in flexible electronic devices to greatly enhance lifetime and durability without affecting the device characteristics. In addition, graphene may be uses as an electrode material for secondary cells, supercapacitors, or the like.

II) With good thermal conductivity, graphene is esteemed as a new heat-sink material capable of solving problems in the manufacture of high-efficiency, high-brightness III-V GaN-based LEDs.

III) Further, superior dispersibility and good strength resulting from the 2-dimensional planar structure allow it to be used for carbon composite materials.

IV) Since the energy in graphene shows a linear relationship in the energy-wavenumber (E-k) diagram, it acts as if the effective mass of the electron ($m_e^* = \partial^2 E / \partial k^2$) is nearly 0. That is, it exhibits an effect as if the electron traveled fast like the massless photon. Accordingly, it has high potential as the next-generation transistor material for ultrafast electronic devices.

V) Besides, graphene can be used as a barrier film material because it has very low water permeability. Thus, it can be used as a barrier film material for flexible electronic devices and for packing and medical applications.

Thus, studies on the preparation of pure graphene are on the increase. The existing methods for preparing graphene include, in addition to the method of physically preparing graphene through exfoliation from graphite using a Scotch tape, a method of preparing graphene using carbon nanotube (CNT) [M. Terrones, Materials science: Nanotubes unzipped, *Nature*, 458, 845 (2009)], a method of growing graphene by chemical vapor deposition (CVD) [K. S. Kim et al., Large-scale pattern growth of graphene films for stretchable transparent electrodes, *Nature*, 457, 706 (2009); D. H. Lee et al., Versatile carbon hybrid films composed of vertical carbon nanotubes grown on mechanically compliant graphene films, *Adv. Mater.*, 22, 1247 (2010)], and a method of chemical exfoliation from liquid phase [A. A. Green et al., Solution phase production of graphene with controlled thickness via density differentiation, *Nano Letters*, 9, 4031 (2009)].

However, the known methods are expensive and do not readily give pure graphene. Accordingly, there is a need of a simple method for preparing pure graphene.

SUMMARY

The inventors of the present invention have researched for a method allowing easy preparation of pure graphene. As a result, they have found out that when oxidized graphite is mixed with metal oxide nanoparticles and treated with an acid, graphene in the shell portion of the quasi metal oxide-graphene core-shell nanoparticles is exfoliated in a planar form.

The present invention is directed to providing a method for preparing graphene, including mixing oxidized graphite with metal oxide nanoparticles and then treating with an acid.

The present invention is also directed to providing nanoparticles of a metal oxide-graphene core-shell structure wherein graphene surrounds metal oxide nanoparticles, prepared by mixing oxidized graphite with metal oxide nanoparticles.

In one general aspect, the present invention provides a method for preparing graphene using metal oxide, including: 1) preparing graphite oxide by treating the surface of graphite with an acid; 2) preparing particles wherein carbon is bonded to metal oxide by mixing the graphite oxide with metal oxide nanoparticles; and 3) separating graphene by treating the prepared particles with an acid.

In another general aspect, the present invention provides nanoparticles of a metal oxide-graphene core-shell structure wherein graphene surrounds metal oxide nanoparticles, prepared by reacting graphite oxide with metal oxide nanoparticles.

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1:
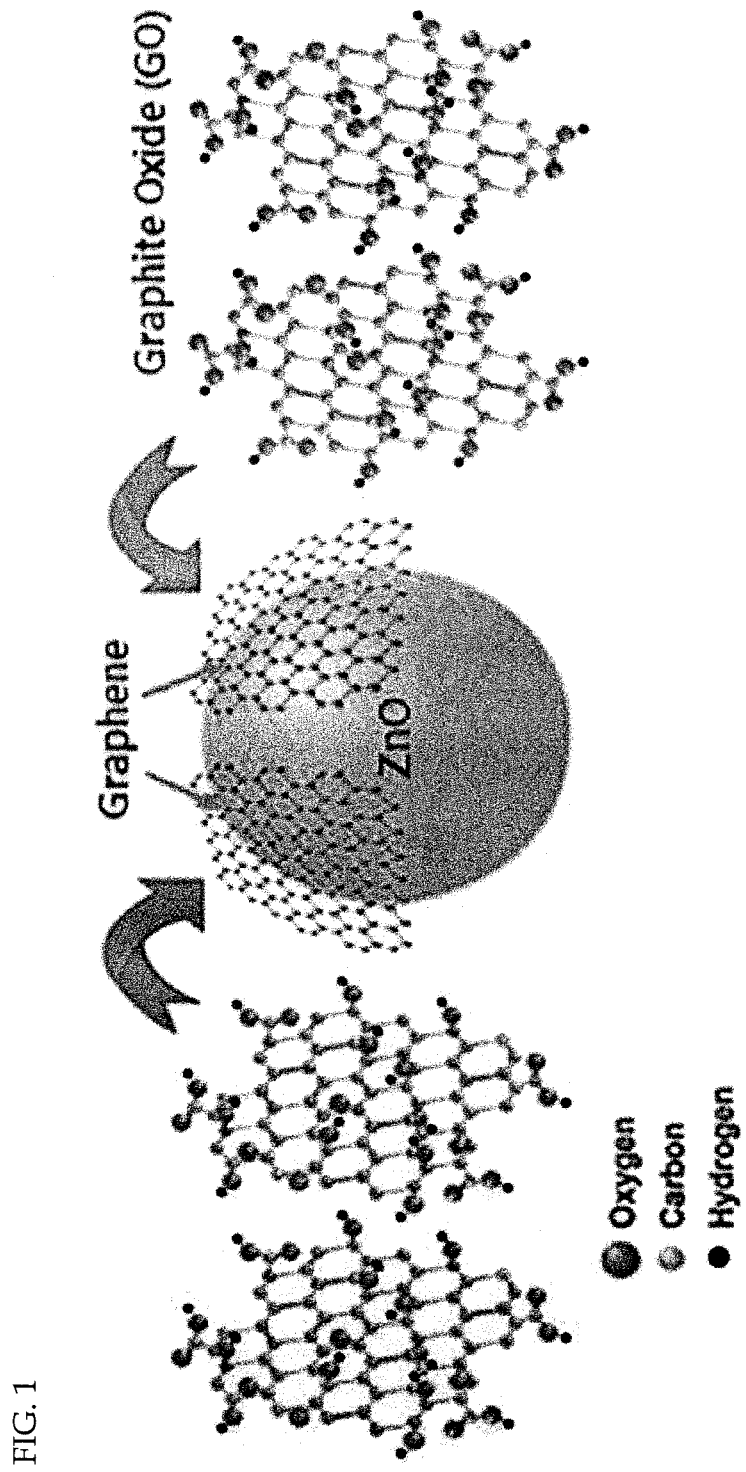
FIG. 1 schematically shows a procedure whereby a layer of graphite oxide is exfoliated from the surface of zinc oxide nanoparticles.
Figure 2:
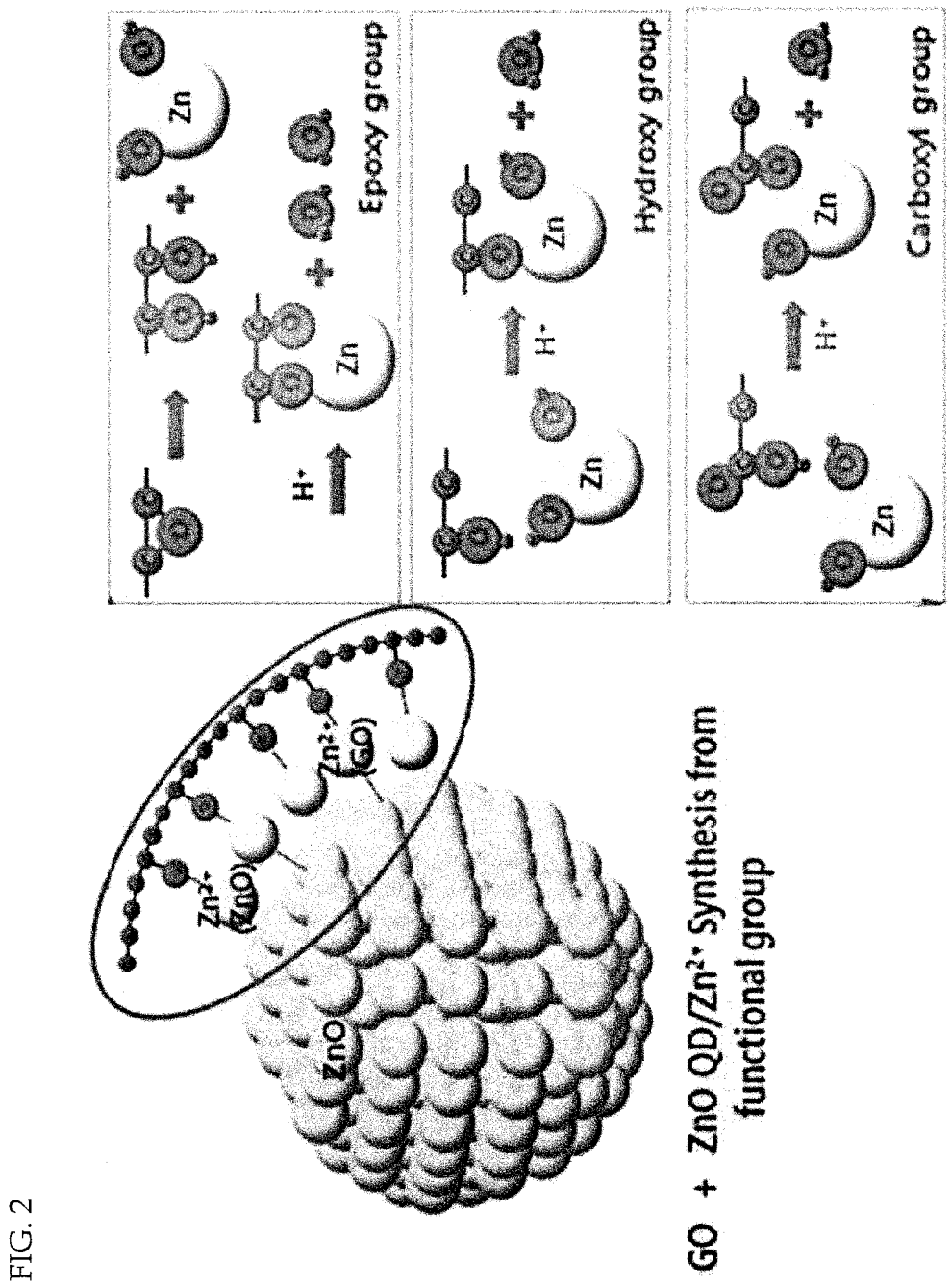
FIG. 2 schematically shows chemical bonding between the functional groups (carboxyl, hydroxyl and epoxy groups) on an exfoliated carbon monolayer and zinc oxide nanoparticles.
Figure 3:
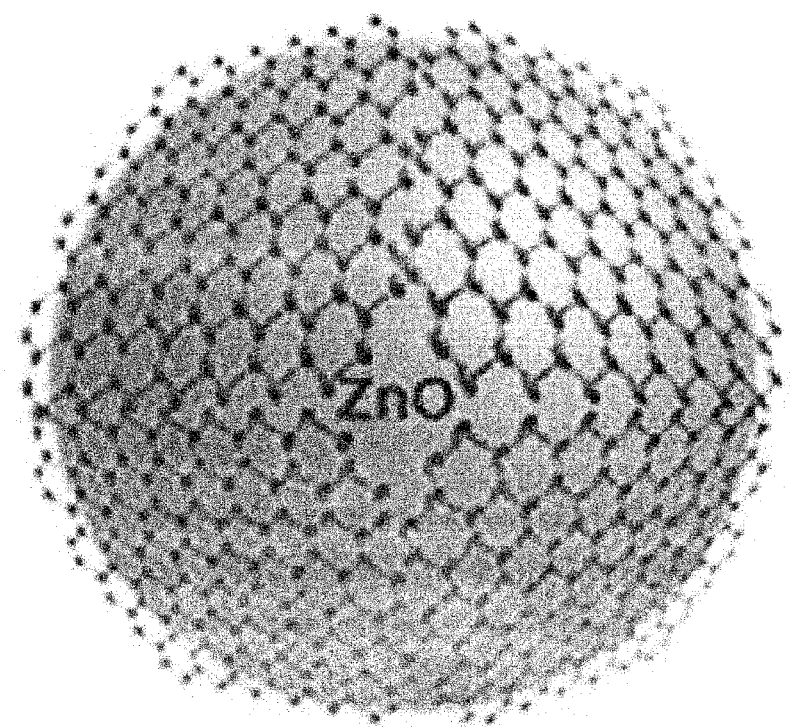
FIG. 3 schematically shows a zinc oxide nanoparticle of a quasi metal oxide-graphene core-shell structure wherein graphene surrounds the nanoparticle.
Figure 4:
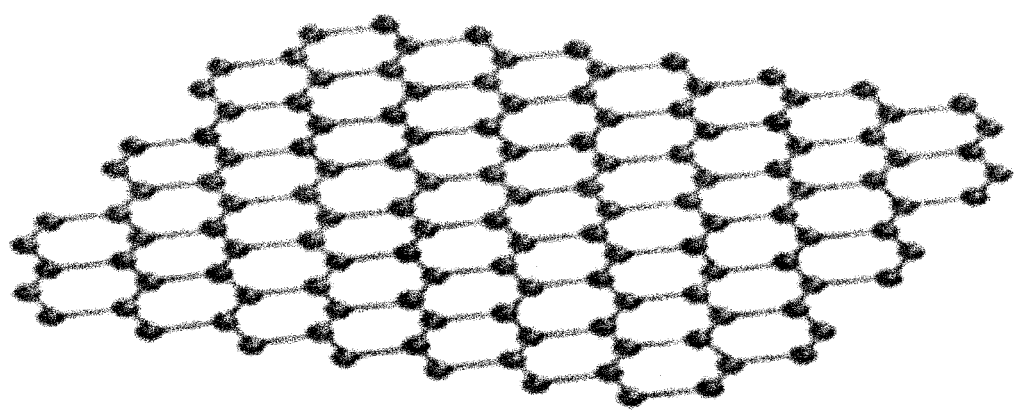
FIG. 4 schematically shows graphene obtained by removing zinc oxide from a nanoparticle of a quasi zinc oxide-graphene core-shell structure.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments.

On the contrary, the invention is intended to cover not only the exemplary embodiments, but also various alternatives, modifications, equivalents and other embodiments, which may be included within the spirit and scope of the invention as defined by the appended claims.

The present invention provides a method for preparing pure graphene using chemical bonding between graphite oxide and metal oxide nanoparticles.

The method for preparing graphene of the present invention comprises: 1) preparing graphite oxide by treating the surface of graphite with an acid; 2) preparing particles wherein carbon is bonded to metal oxide by mixing the graphite oxide with metal oxide nanoparticles; and 3) separating graphene by treating the prepared particles with an acid.

First, the surface of graphite is treated with an acid to prepare graphite oxide having functional groups on the graphite surface. The acid treatment may be performed by adding graphite in powder form to and reacting with an acid to form functional groups such as carboxyl (—COOH), hydroxyl (—OH) or epoxy groups on the graphite surface. The acid may be one or more selected from sulfuric acid, nitric acid and hydrochloric acid. Specifically, a mixture of sulfuric acid and nitric acid may be used.

Upon the acid treatment, the graphite turns dark gray, which is washed and dried to obtain graphite oxide.

Then, the prepared graphite oxide is mixed with metal oxide nanoparticles to prepare particles wherein carbon is bonded to metal oxide. When the graphite oxide is mixed with metal oxide nanoparticles, solid components are formed in the solution, which may be dried to obtain the particles wherein carbon is bonded to metal oxide.

The metal oxide is not particularly limited. Specifically, it may be selected from $ZnO$, $CuO$, $BaCO_3$, $Bi_2O_3$, $B_2O_3$, $CaCO_3$, $CeO_2$, $CrO_2$, $Cr_2O_3$, $FeO$, $CoO$, $NiO$, $GeO$, $Y_2O_3$, $ZrO_2$, $MoO$, $RuO_2$, $PdO$, $AgO$, $CdO$, $SnO$, $HfO_2$, $Ta_2O_5$, $Fe_2O_3$, $Ga_2O_3$, $In_2O_3$, $Li_2CO_3$, $LiCoO_2$, $MgO$, $IrO_2$, $Al_2O_3$, $SiO_2$, $P_2O_5$, $PO_2$, $CaO$, $Sc_2O_3$, $Mn_2O_3$, $MnCO_3$, $MnO_2$, $Mn_3O_4$, $Nb_2O_5$, $PbO$, $Sb_2O_3$, $SnO_2$, $SrCO_3$, $Ta_2O_5$, $TiO_2$, $BaTiO_3$, $VO_2$, $V_2O_5$, $WO3$, $Bi_2O_3$ and $ZrO_2$. More specifically, $ZnO$ or $CuO$ may be used.

The metal oxide nanoparticles may be prepared by dissolving a precursor of the metal oxide in a solvent. The precursor of the metal oxide may be any derivative of the corresponding metal without limitation. For example, a compound that can be dissolved in a reaction solvent to form the metal oxide nanoparticles, such as acetate, acetate monohydrate, acetate dihydrate, nitrate tetrahydrate or nitrate hexahydrate of the corresponding metal, may be used.

Specifically, the graphite oxide and the metal oxide nanoparticles may be mixed in a reaction solvent. The reaction solvent may be selected from N,N-dimethylformamide and N,N-diethylformamide.

The precursor of the metal oxide may be dissolved in the solvent to a concentration of 0.0001 to 0.1 M. This range is preferred for uniform dispersion of the metal oxide nanoparticles.

Although the graphite oxide with the metal oxide nanoparticles may be mixed in one reaction solvent, they may also be dispersed in different solvents and then mixed to prepare a solution of the graphite oxide solution and the metal oxide. In this case, the mixing ratio of the solutions may be in the range from 1:1 to 1:10 based on volume.

When the graphite oxide is mixed with the metal oxide nanoparticles, the functional groups (carboxyl, hydroxyl and epoxy groups) formed on the surface of the graphite comprising multiple carbon layers are chemically bonded to the metal oxide nanoparticles. Then, as the carbon layers are exfoliated, they are bent and surround the metal oxide nanoparticles to form particles of a quasi metal oxide-graphene core-shell structure.

Next, the particles of a quasi metal oxide-graphene core-shell structure are treated with an acid so as to dissolve the metal oxide in the core portion. When the metal oxide is dissolved by the acid, the bent graphene is stretched to give a planar monolayer.

The acid used in the acid treatment may be a strong acid with pH 5 or lower. More specifically, hydrochloric acid, nitric acid, sulfuric acid or a mixture thereof may be used to dissolve the metal oxide.

FIGS. 1 to 4 schematically show a process whereby the quasi metal oxide-graphene core-shell structure is formed.

The present invention also provides graphene prepared from the above-described preparation process.

The present invention also provides nanoparticles of a metal oxide-graphene core-shell structure wherein graphene surrounds metal oxide nanoparticles, which are prepared by reacting graphite oxide with metal oxide nanoparticles. The nanoparticles have a core-shell structure wherein the metal oxide forms a core and the monolayer graphene exfoliated from the graphite oxide is bent to form a shell.

EXAMPLES

The examples and experiments will now be described. The following examples and experiments are for illustrative purposes only and not intended to limit the scope of this invention.

Preparation Example

Preparation of Graphite Oxide 30 mg of graphite powder (Alfa Aesar) was added to an acid solution prepared by mixing 18 M sulfuric acid ($H_2SO_4$) with 17 M nitric acid ($HNO_3$) at a volume ratio of 3:1. Then, sonication was performed at 45° C. with 200 W for 2 hours.

The sonicated dispersion was kept at room temperature for about 4 days. The color of the dispersion turned dark grey. The dispersion was repeatedly centrifuged using water and decanted, washed with ethanol, and dried in an oven of 55° C. for 12 hours to obtain grey graphite oxide.

Example 1

Preparation of ZnO-Graphene Nanoparticles 40 mg of graphite oxide obtained in Preparation Example was sonicated in 40 mL of N,N-dimethylformamide for 10 minutes to obtain a graphite oxide dispersion.

0.93 g of zinc acetate dehydrate ($Zn(CH_3COO)_2 \cdot H_2O$) was dissolved in 200 mL of N,N-dimethylformamide to prepare a zinc precursor solution.

In N,N-dimethylformamide, zinc acetate dehydrate can be converted to zinc oxide according to Scheme 1.

[Scheme 1]

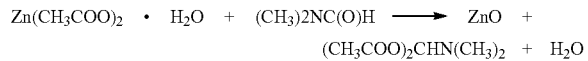

$Zn(CH_3COO)_2 \cdot H_2O + (CH_3)_2NC(O)H \longrightarrow ZnO + (CH_3COO)_2CHN(CH_3)_2 + H_2O$ Then, the graphite oxide dispersion was added to the zinc precursor solution and stirred at 95° C. at a speed of 150 rpm. The mixture solution was initially black, but turned transparent 30 minutes later and gradually turned turbid and white 1 hour later. After 5 hours, grey solid components were produced in a transparent solution. The solid components were separated.

The solid components were washed with ethanol and distilled water and dried in an oven at 55° C. for 12 hours to obtain powder of nanoparticles with a quasi zinc oxide-graphene core-shell structure.

The powder was added to 100 mL of 0.1 M nitric acid and sonicated for 20 minutes. The resulting dispersion was diluted by adding water.

The diluted solution was filtered to separate the product, which was washed with ethanol and distilled water and dried in vacuum to give the final product graphene.

Figure 5:
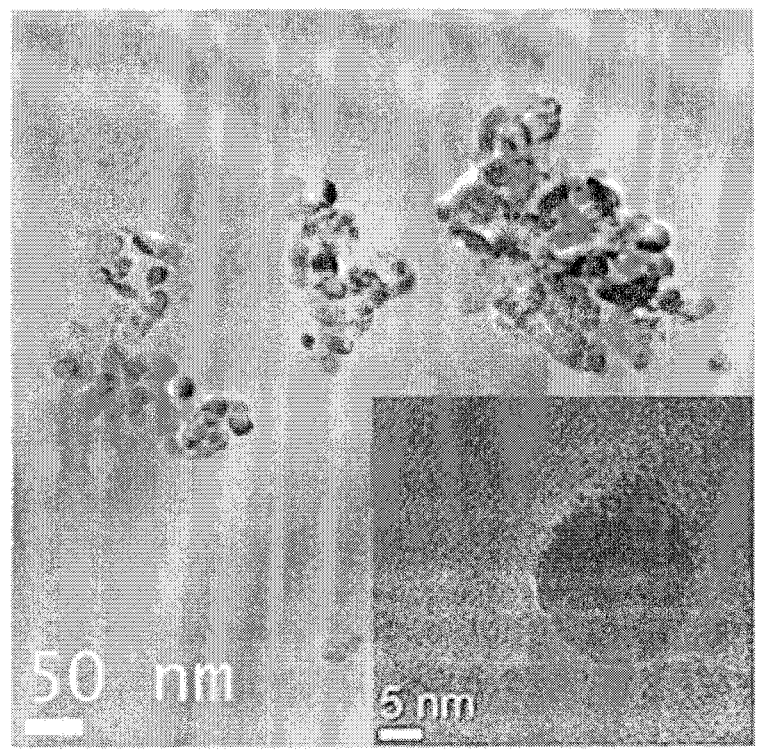
FIG. 5 shows a transmission electron microscopic image of particles of a quasi zinc oxide-graphene core-shell structure prepared in Example 1.

FIG. 5 shows a high-resolution transmission electron microscopic (TEM) image of thus prepared particles of a quasi zinc oxide-graphene core-shell structure.

Figure 6:
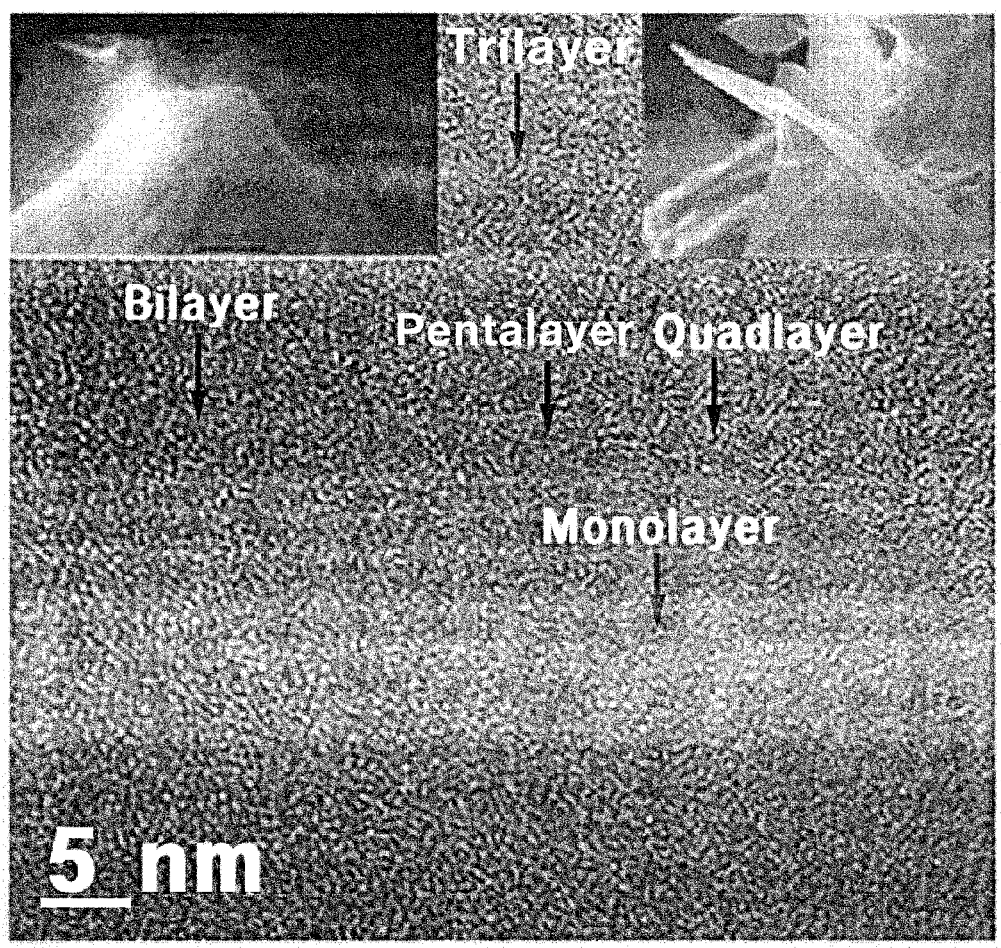
FIG. 6 shows a transmission electron microscopic image and a scanning electron microscopic image of graphene prepared in Example 1.

FIG. 6 shows a high-resolution transmission electron microscopic image and a scanning electron microscopic (SEM) image of the finally produced graphene. As seen from the TEM image of FIG. 6, the graphene was composed of one to five layers. And, the SEM image shows that graphene is stretched thinly as a whole.

Figure 7:
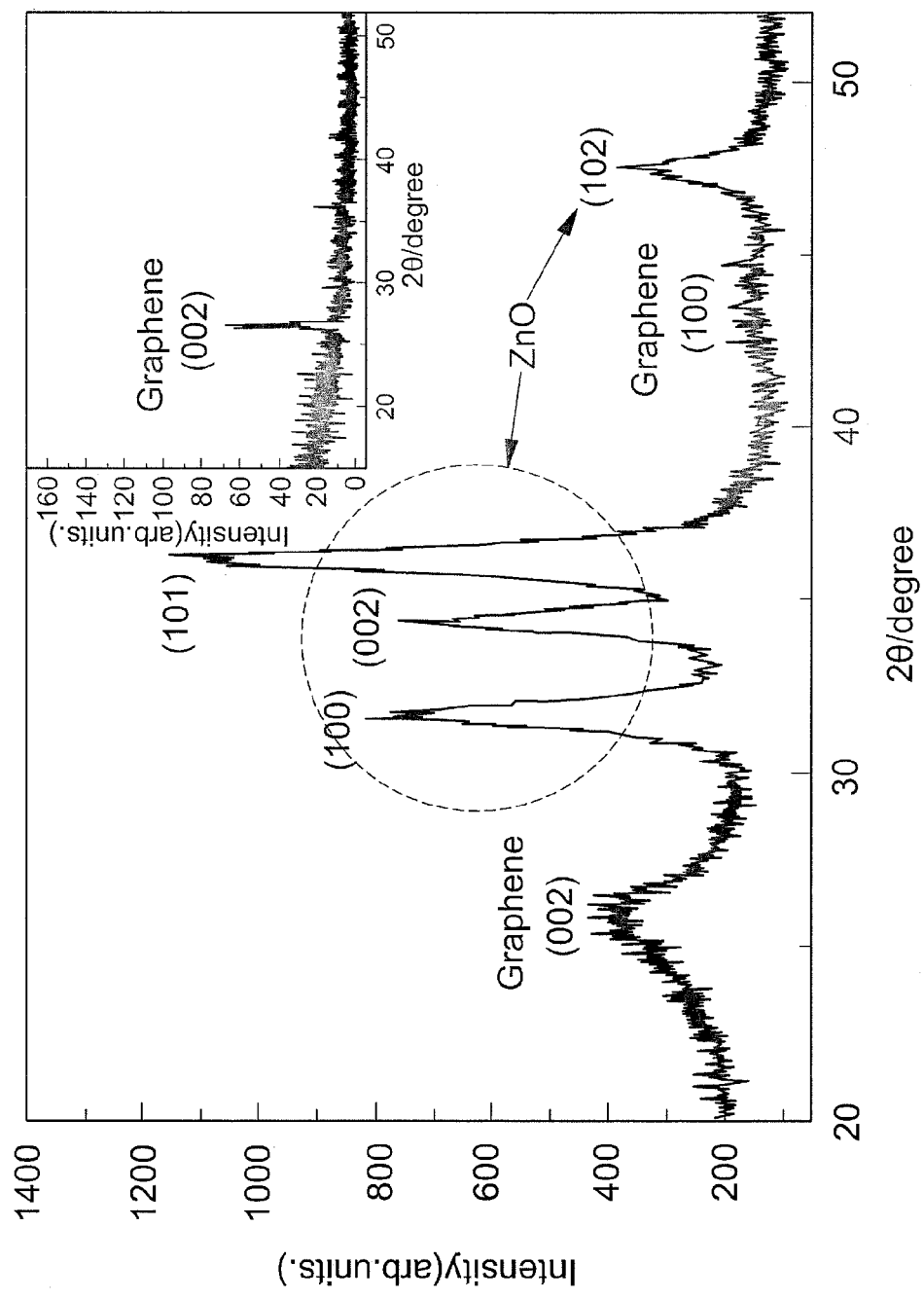
FIG. 7 shows an X-ray diffraction pattern of particles of a quasi zinc oxide-graphene core-shell structure and graphene (top right) prepared in Example 1.

FIG. 7 shows an X-ray diffraction pattern of the nanoparticles of a quasi zinc oxide-graphene core-shell structure and the finally produced graphene (Rigaku ATX-G, Cu Kα=0.154 nm). As seen from FIG. 7, the X-ray diffraction pattern of the powder of nanoparticles reveals the zinc oxide core grown in the directions of (100), (002) and (101) and the graphene shell grown in the directions of (002) and (100). And, X-ray diffraction pattern of the graphene shows that only the graphene grown in the directions of (002) and (100) exists.

Raman spectroscopic analysis was carried out in order to further elucidate the structure of particles of a quasi zinc oxide-graphene core-shell structure and graphene. The result is shown in FIGS. 8 and 9.

Figure 8:
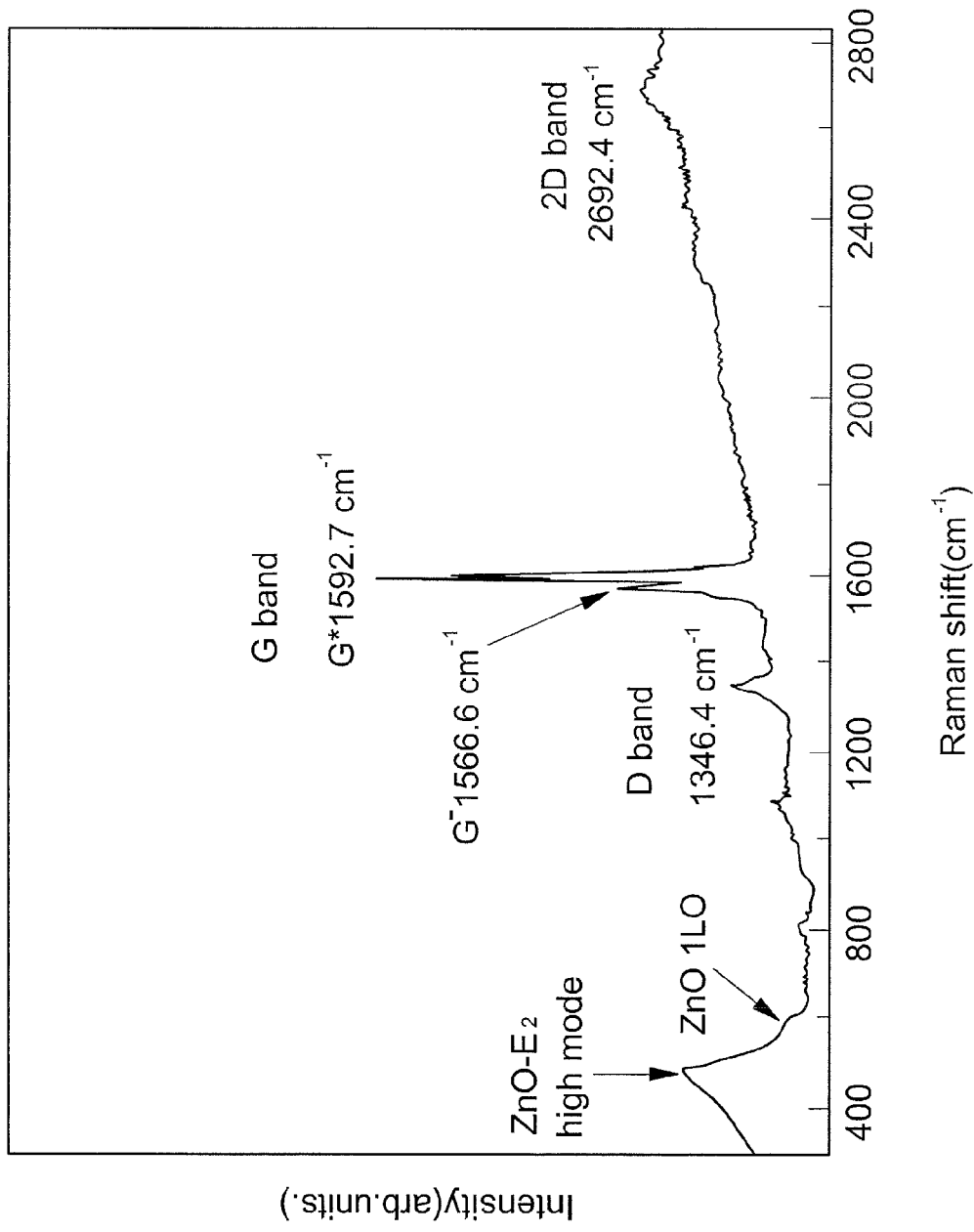
FIG. 8 shows a Raman spectrum of particles of a quasi zinc oxide-graphene core-shell structure prepared in Example 1.

FIG. 8 reveals that the shell comprising a single layer of graphene surrounds the zinc oxide core through chemical bonding.

Figure 9:
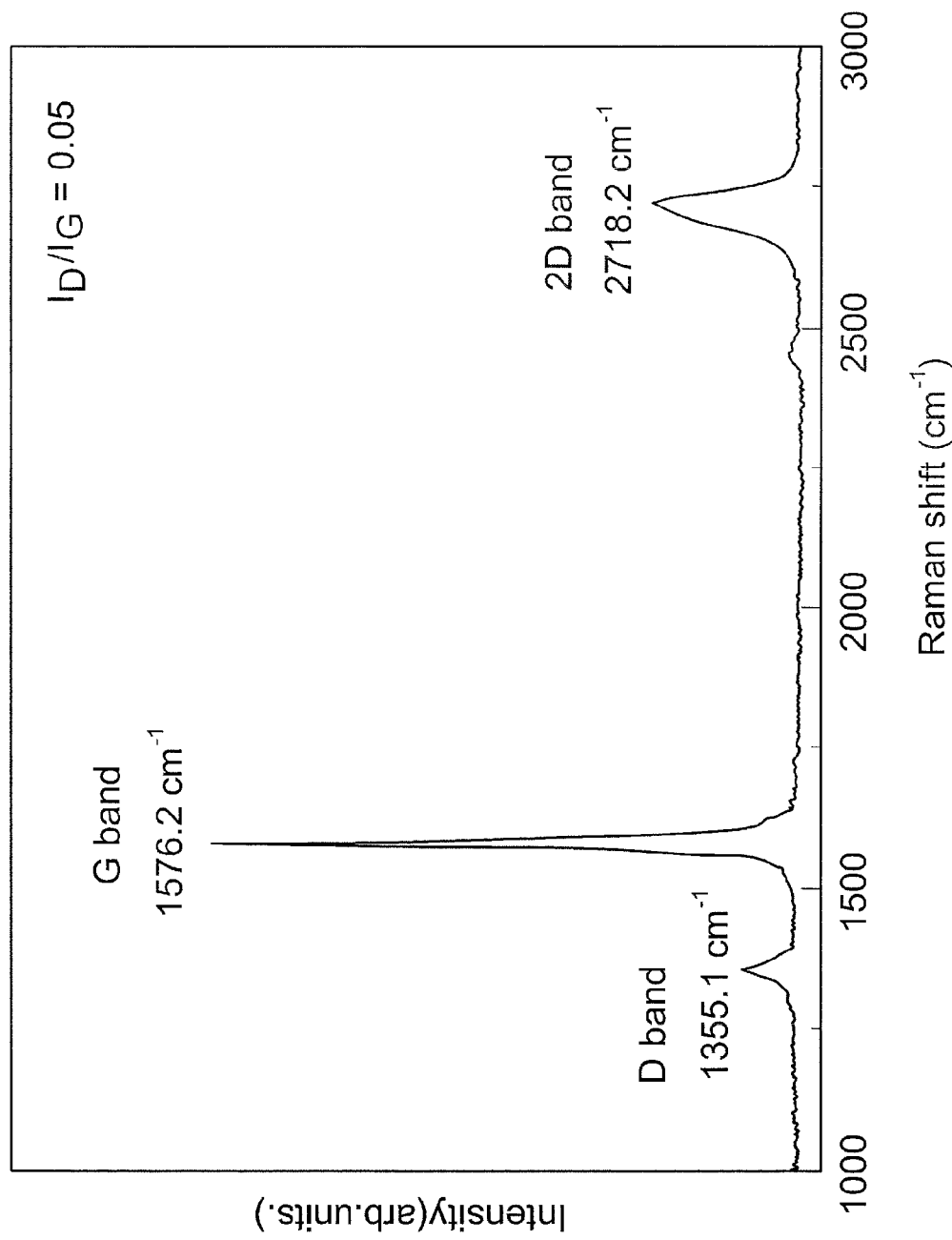
FIG. 9 shows a Raman spectrum of graphene prepared in Example 1.

And, FIG. 9 shows that the ratio of the intensity of D band and G band, $I_D/I_G$ is very small with 0.05. This indicates that the prepared graphene has few defects.

Figure 10:
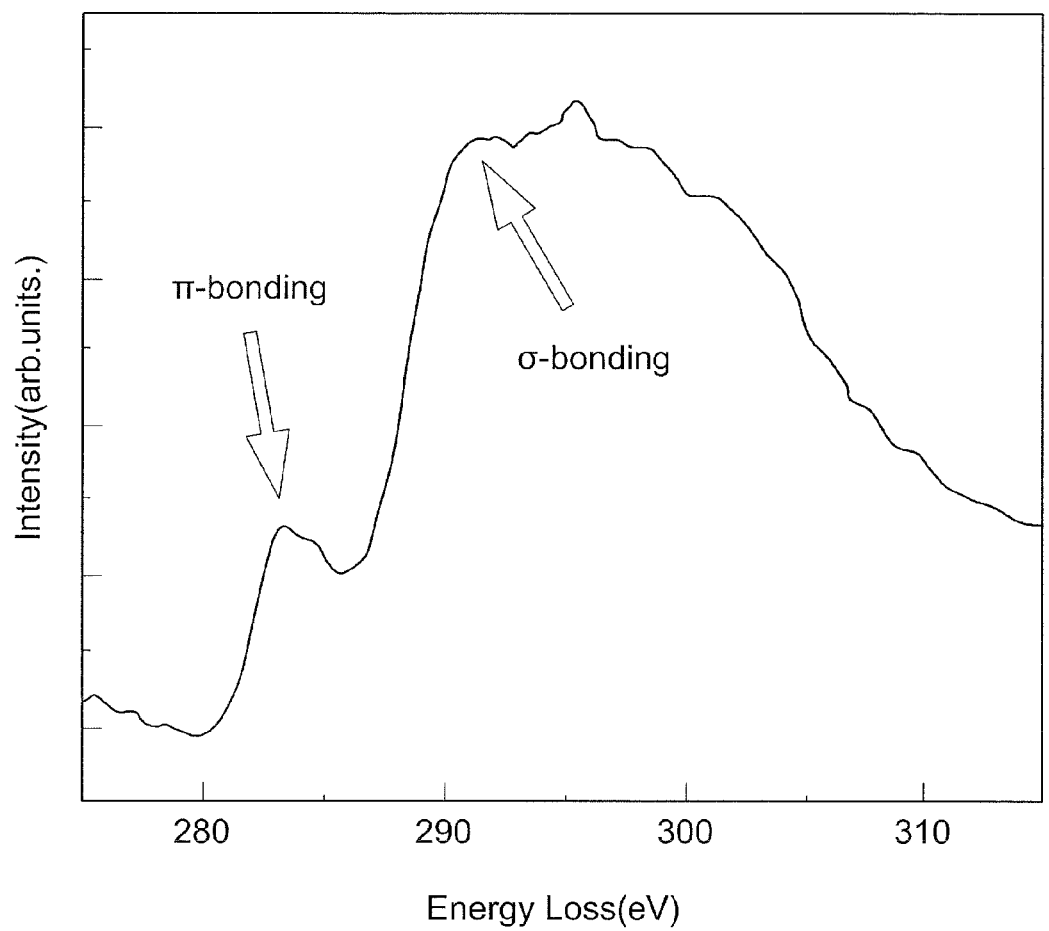
FIG. 10 shows an analysis result of graphene prepared in Example 1 by electron energy loss spectroscopy (EELS)

FIG. 10 shows an electron energy loss spectroscopic (EELS) spectrum of the prepared graphene. In FIG. 10, the presence of π-bonding and σ-bonding confirms that graphene was prepared. The fact that the σ-bonding is significantly less than the graphene prepared through existing other methods reveals that the graphene prepared in accordance with the present invention has very good purity.

Figure 11:
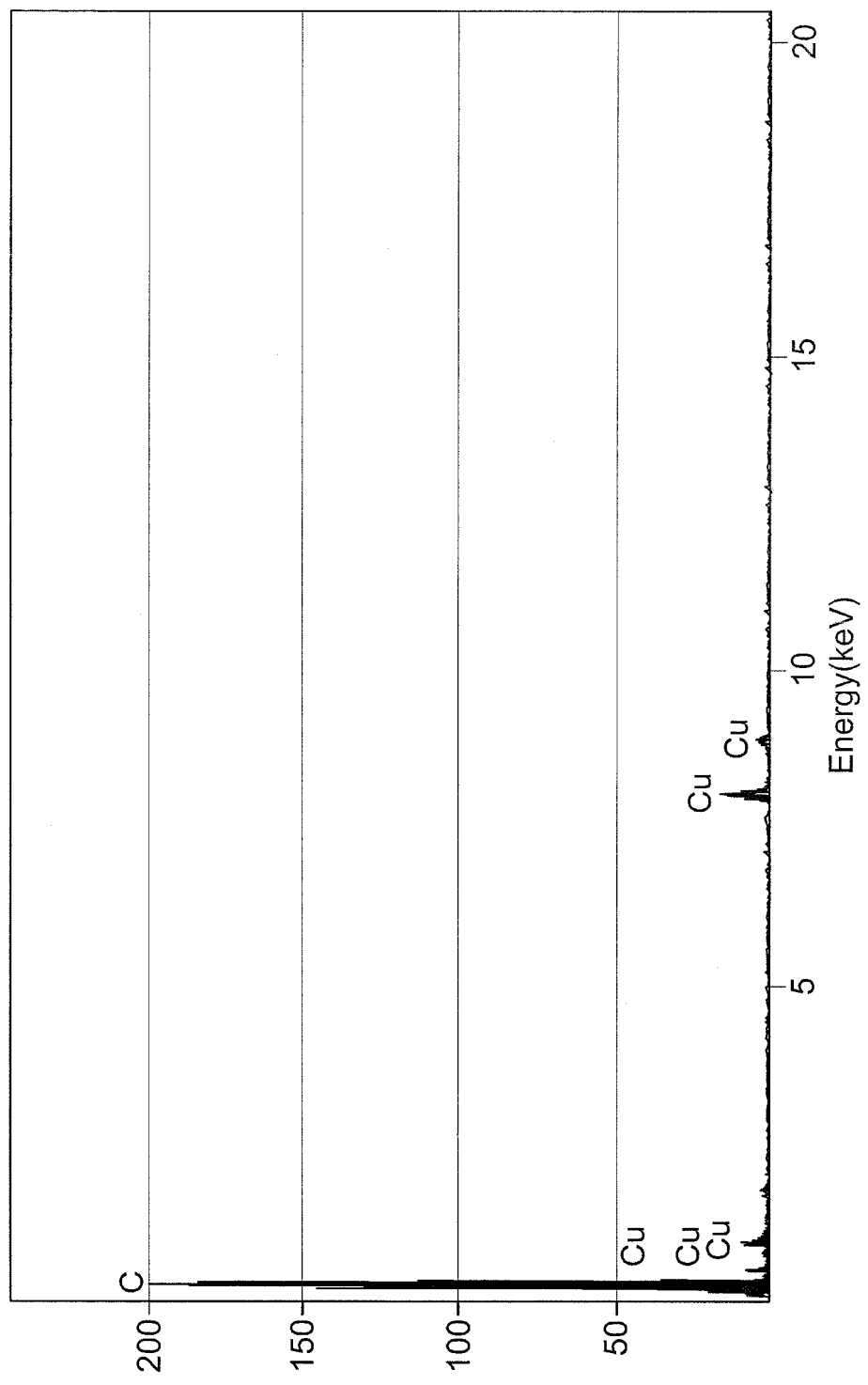
FIG. 11 shows an energy-dispersive X-ray emission (EDX) spectrum of graphene prepared in Example 1.
Figure 12:
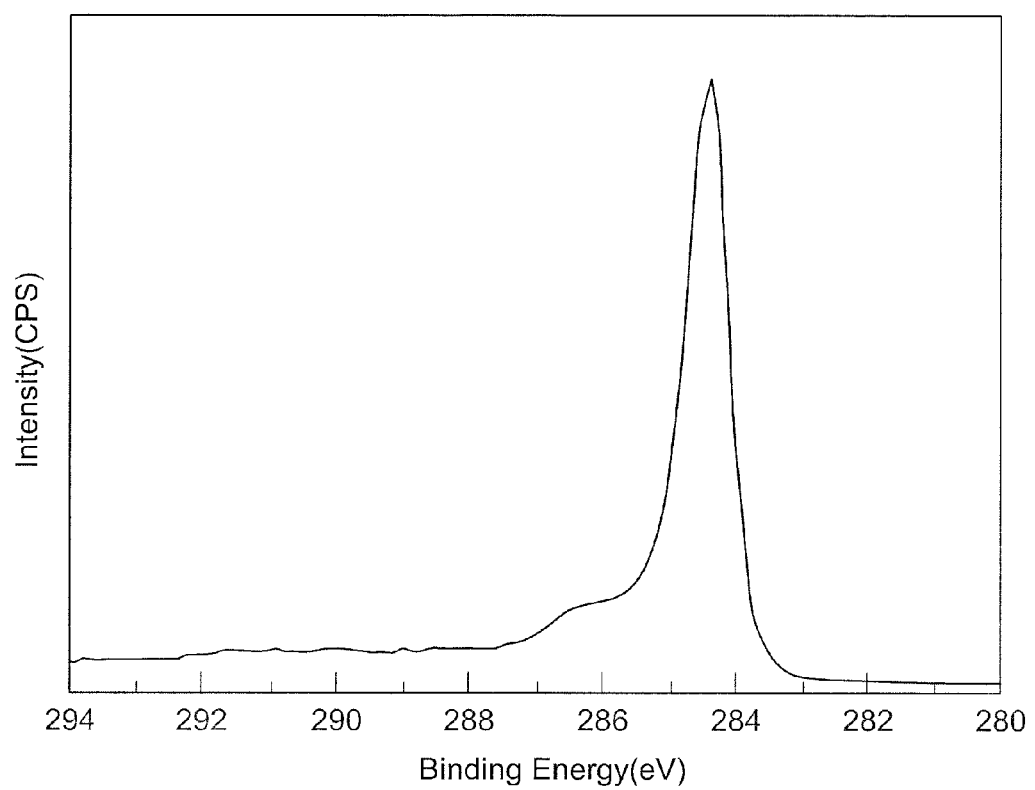
FIG. 12 shows an X-ray photoelectron spectroscopy (XPS) spectrum of graphene prepared in Example 1.

FIGS. 11 and 12 respectively show an energy-dispersive X-ray emission (EDX) spectrum and an X-ray photoelectron spectroscopy (XPS) spectrum of the prepared graphene. As seen from the figures, it can be seen that the graphene consists only of carbon, without any impurities.

Example 2

Preparation of CuO-Graphene Nanoparticles 40 mg of graphite oxide obtained in Preparation Example was sonicated in 40 mL of N,N-dimethylformamide for 10 minutes to obtain a graphite oxide dispersion.

0.93 g of copper(II) acetate monohydrate ($Cu(CH_3COO)_2 \cdot H_2O$) was dissolved in 200 mL of N,N-dimethylformamide to prepare a copper precursor solution. Then, the graphite oxide dispersion was added to the copper precursor solution and stirred at 95° C. at a speed of 150 rpm. The mixture solution was initially black, but turned transparent 30 minutes later and gradually turned turbid and white 1 hour later. After 5 hours, khaki solid components were produced in a transparent solution. The solid components were separated.

The solid components were washed with ethanol and distilled water and dried in an oven at 55° C. for 12 hours to obtain powder of nanoparticles with a quasi copper oxide-graphene core-shell structure.

The powder was added to 100 mL of 0.1 M hydrochloric acid and sonicated for 20 minutes. The resulting dispersion was diluted by adding water.

The diluted solution was filtered to separate the product, which was washed with ethanol and distilled water and dried in vacuum to give the final product graphene.

Figure 13:
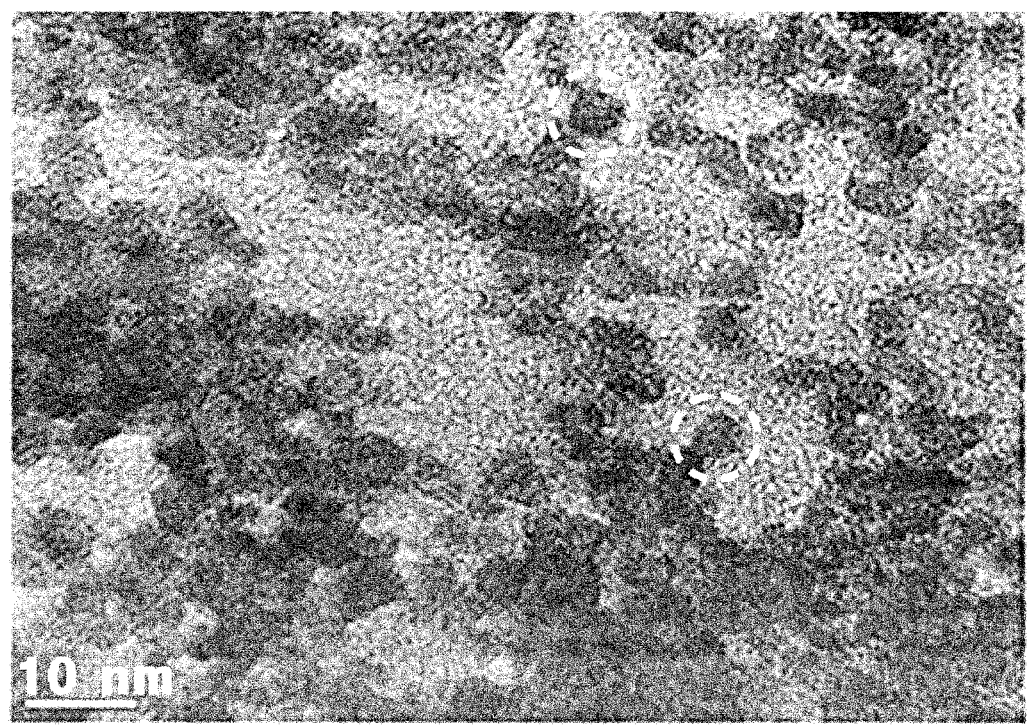
FIG. 13 shows a transmission electron microscopic image of particles of a quasi copper oxide-graphene core-shell structure prepared in Example 2.

FIG. 13 shows a high-resolution transmission electron microscopic image of thus prepared particles of a quasi copper oxide-graphene core-shell structure.

Figure 14:
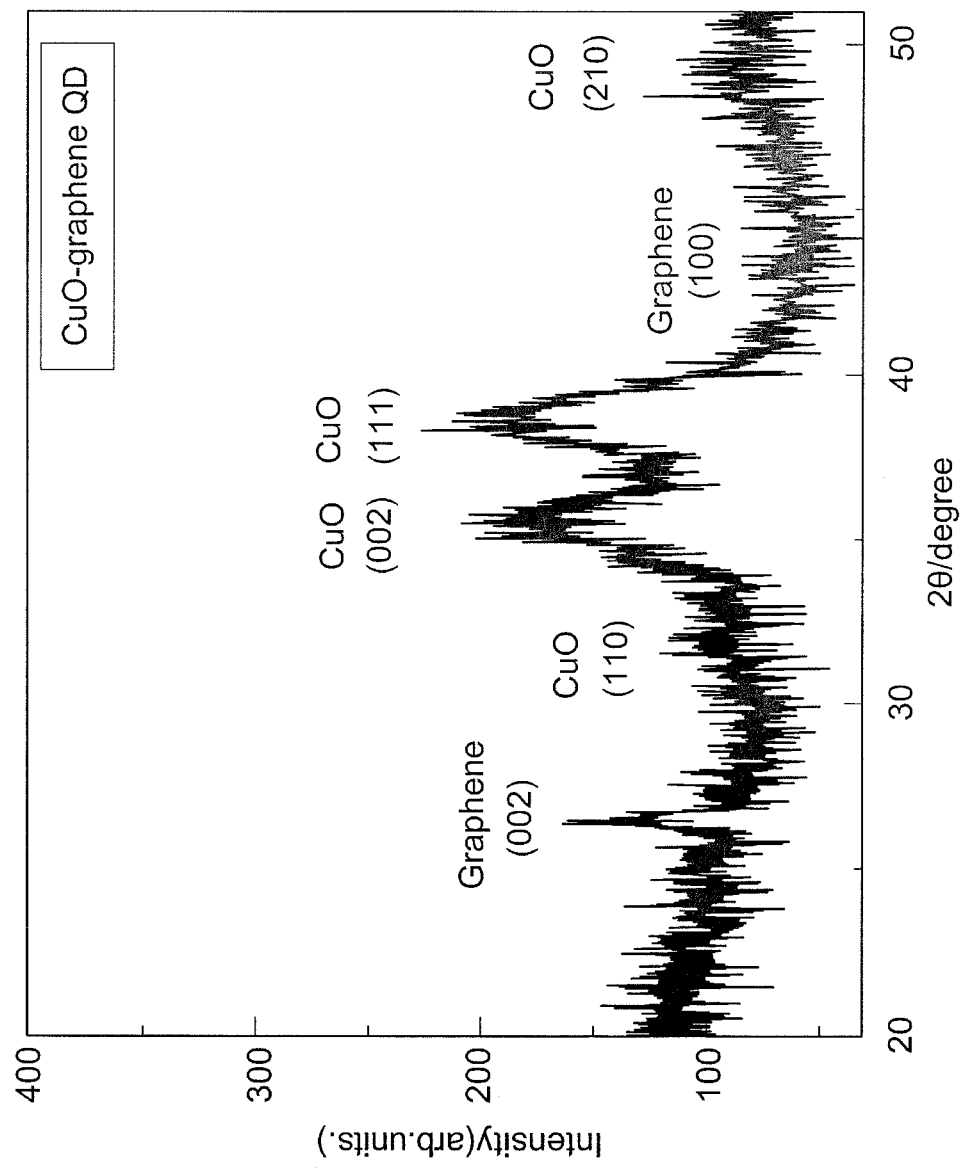
FIG. 14 shows an X-ray diffraction pattern of particles of a quasi copper oxide-graphene core-shell structure prepared in Example 2.

FIG. 14 shows an X-ray diffraction pattern of the nanoparticles of a quasi copper oxide-graphene core-shell structure and the finally produced graphene. As seen from FIG. 14, the X-ray diffraction pattern of the powder of nanoparticles reveals the copper oxide (CuO, $Cu^{2+}$) core grown in the directions of (100), (002), (111) and (210). $Cu_2O$ ($Cu^+$) was not formed. The X-ray diffraction pattern also reveals the graphene shell grown in the directions of (002) and (100).

The method for preparing graphene of the present invention allows chemical bonding and separation through a simple acid treatment process using inexpensive materials. Also, because the reaction can be carried out at low temperature, the processing cost is low. And, pure graphene with few impurities can be prepared quickly in large scale.

Since the particles of a quasi metal oxide-graphene core-shell structure obtained as intermediate have a graphene shell having very high electron mobility, they have very fast electron transfer rate. Accordingly, with fast response speed and superior optical properties, they may be used in UV sensors, LEDs, and dye-sensitized solar cells (DSSCs), replacing metal-oxide quantum dots or $TiO_2$.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing graphene comprising:
   mixing together a graphite oxide dispersion and a metal precursor solution to obtain solid components to form metal-oxide-graphene nanoparticle, wherein the metal oxide is selected from the group consisting of $BaCO_3$, $Bi_{203}$, $B_{203}$, $CaCO_3$, $CeO_2$, $GeO$, $Y_2O_3$, $PdO$, $AgO$, $CdO$, $Ga_2O_3$, $In_2O_3$, $Li_2CO_3$, $IrO_2$, $P_2O_5$, $PO_2$, $CaO$, $Sc_2O_3$, $Nb_2O_5$, $PbO$, $Sb_2O_3$, and $SrCO_3$;
   separating solid components from the reaction solvent;
   washing the separated solid components with a washing solvent; and
   removing the metal oxide with acid away from the solid components to components to form graphene, wherein graphene comprises a structure of one-atom-thick planar sheet of carbon atoms.

2. The method for preparing graphene according to claim 1, wherein the solid components comprise a metal oxide-graphene core-shell in which graphene surrounds a core comprising nanoparticles of the metal oxide.

3. The method for preparing graphene according to claim 1, further comprising:
   treating graphite powder into an acid solution comprising sulfuric acid and nitric acid to form graphite oxide; and
   drying the graphite oxide to form the graphite oxide powder.

4. The method for preparing graphene according to claim 1, wherein removing the metal oxide away from the solid components to form graphene by using an acid selected from the group consisting of hydrochloric acid, nitric acid, sulfuric acid and a mixture thereof.

5. Nanoparticles comprising:
   a core comprising a metal oxide selected from the group consisting of $BaCO_3$, $Bi_2O_3$, $B_2O_3$, $CaCO_3$, $CeO_2$, $GeO$, $Y_2O_3$, $PdO$, $AgO$, $CdO$, $Ga_2O_3$, $In_2O_3$, $IrO_2$, $P_2O_5$, $PO_2$, $CaO$, $Sc_2O_3$, $Nb_2O_5$, $PbO$, $Sb_2O_3$, and $SrCO_3$; and
   graphene surrounding the core, wherein graphene comprises a structure of one-atom-thick planar sheet of carbon atoms.

6. A method for preparing graphene comprising:
   treating graphite powder mixed with an acid solution consisting essentially of sulfuric acid and nitric acid to form a graphite oxide dispersion;
   isolating graphite oxide powder from the graphite oxide dispersion;
   mixing together the graphite oxide powder and a reaction solvent to prepare a graphite oxide dispersion;
   mixing together a graphite oxide dispersion and a metal precursor solution to obtain solid components to form metal-oxide-graphene nanoparticle, wherein the metal oxide is selected from the group consisting of $BaCO_3$, $Bi_2O_3$, $B_2O_3$, $CaCO_3$, $CeO_2$, $GeO$, $Y_2O_3$, $PdO$, $AgO$, $CdO$, $In_2O_3$, $IrO_2$, $P_2O_5$, $PO_2$, $CaO$, $Sc_2O_3$, $Nb_2O_5$, $PbO$, $Sb_2O_3$, and $SrCO_3$;
   separating solid components from the reaction solvent;
   washing the separated solid components with a washing solvent; and
   removing the metal oxide with acid away from the solid components to form graphene, wherein graphene comprises a structure of one-atom-thick planar sheet of carbon atoms.

7. The method of claim 6, wherein the acid solution for treating graphite powder comprises sulfuric acid at about 18M and nitric acid at about 17M mixed together at a respective volume ratio of about 3:1.

8. A method for preparing graphene comprising:
   treating graphite powder mixed with an acid solution consisting essentially of sulfuric acid and nitric acid to form a graphite oxide dispersion;
   isolating graphite oxide powder from the graphite oxide dispersion;
   mixing together the graphite oxide powder and a reaction solvent to prepare a graphite oxide dispersion;
   mixing together a graphite oxide dispersion and a metal precursor solution to obtain solid components to form metal-oxide-graphene nanoparticle, wherein the metal oxide is selected from the group consisting of $BaCO_3$, $Bi_2O_3$, $B_2O_3$, $CaCO_3$, $CeO_2$, $GeO$, $Y_2O_3$, $MoO$, $RuO_2$, $PdO$, $AqO$, $CdO$, $HfO_2$, $In_2O_3$, $IrO_2$, $P_2O_5$, $PO_2$, $CaO$, $Sc_2O_3$, $Nb_2O_5$, $PbO$, $Sb_2O_3$, and $SrCO_3$;
   separating solid components from the reaction solvent;
   washing the separated solid components with a washing solvent; and
   removing the metal oxide with acid away from the solid components to form graphene, wherein graphene comprises a structure of one-atom-thick planar sheet of carbon atoms,
   wherein treating comprises:
   sonicating and heating the graphite powder mixed with the acid solution to form a sonicated dispersion; and
   keeping the sonicated dispersion for about 4 days at room temperature.

9. The method of claim 8, wherein sonicating and heating is performed at about 45° C. with 200 W for about 2 hours.

10. The method of claim 6, wherein isolating the graphite oxide powder comprises:
    centrifuging the graphite oxide dispersion;
    decanting and washing the centrifuged graphite oxide dispersion with ethanol; and
    drying the decanted and washed the centrifuged graphite oxide dispersion to obtain the graphite oxide powder.

11. The method for preparing graphene according to claim 1, wherein the metal oxide is selected from $Bi_2O_3$, $B_2O_3$, $CeO_2$, $GeO$, $Y_2O_3$, $PdO$, $AgO$, $CdO$, $In_2O_3$, $IrO_2$, $Sc_2O_3$, $Nb_2O_5$, $PbO$, $Sb_2O_3$, and $SrCO_3$.

12. The method for preparing graphene according to claim 1, wherein the metal oxide is selected from $Y_2O_3$, $PdO$, $AgO$, $CdO$, $IrO_2$, $Nb_2O_5$, $PbO$, and $Sb_2O_3$.

13. The method of claim 6, wherein the metal oxide is selected from the group consisting of $BaCO_3$, $Bi_2O_3$, $B_2O_3$, $CaCO_3$, $P_2O_5$, $PO_2$, and $CaO$.

14. The method of claim 6, wherein the metal oxide is selected from the group consisting of $CeO_2$, $GeO$, $Y_2O_3$, $In_2O_3$, $IrO_2$, $Sc_2O_3$, $Nb_2O_5$, $Sb_2O_3$, and $SrCO_3$.

15. The method of claim 6, wherein the metal oxide comprises $Nb_2O_5$.

16. The method of claim 6, wherein the metal oxide comprises $CeO_2$.

17. The method of claim 6, wherein the metal oxide comprises $Sc_2O_3$.

* * * * *